United States Patent
Hansen et al.

(10) Patent No.: US 10,280,280 B2
(45) Date of Patent: May 7, 2019

(54) TRANSLUCENT WHITE POLYMER COMPOSITION AND ITS USE IN GLASS LAMINATES AND OTHER ARTICLES

(71) Applicant: E. I. DU PONT DE NEMOURS AND COMPANY, Wilmington, DE (US)

(72) Inventors: Steven M. Hansen, Wilmington, DE (US); Rebecca L. Smith, Vienna, WV (US)

(73) Assignee: E.I. DU Pont De Nemours and Company, Wilmington, DE (US)

( * ) Notice: Subject to any disclaimer, the term of this patent is extended or adjusted under 35 U.S.C. 154(b) by 0 days.

(21) Appl. No.: 15/130,887

(22) Filed: Apr. 15, 2016

(65) Prior Publication Data

US 2016/0229985 A1    Aug. 11, 2016

Related U.S. Application Data

(63) Continuation of application No. 13/773,968, filed on Feb. 22, 2013, now abandoned.

(60) Provisional application No. 61/602,920, filed on Feb. 24, 2012.

(51) Int. Cl.
| | | |
|---|---|---|
| *B32B 17/10* | (2006.01) | |
| *C08L 33/02* | (2006.01) | |
| *C08K 3/22* | (2006.01) | |
| *E04C 2/54* | (2006.01) | |

(52) U.S. Cl.
CPC .......... *C08K 3/22* (2013.01); *B32B 17/10623* (2013.01); *B32B 17/10651* (2013.01); *B32B 17/10743* (2013.01); *C08L 33/02* (2013.01); *E04C 2/54* (2013.01); *B32B 2250/03* (2013.01); *B32B 2250/40* (2013.01); *B32B 2264/102* (2013.01); *B32B 2307/414* (2013.01); *C08K 2003/2227* (2013.01)

(58) Field of Classification Search
CPC ........ C08L 33/02; B32B 27/308; B32B 27/20
See application file for complete search history.

(56) References Cited

U.S. PATENT DOCUMENTS

| | | | | |
|---|---|---|---|---|
| 3,998,792 A * | 12/1976 | Hermann | .......... | B32B 17/10761 525/56 |
| 4,358,329 A * | 11/1982 | Masuda | ............ | B32B 17/10018 156/106 |
| 6,524,694 B1 * | 2/2003 | Phillips | ................ | C08K 3/0008 428/323 |
| 7,261,943 B2 * | 8/2007 | Fugiel | ................ | B29C 47/0004 428/213 |
| 7,309,143 B2 * | 12/2007 | Takata | ................ | G02B 6/0085 252/582 |
| 8,470,212 B2 * | 6/2013 | Tofuku | ................... | B82Y 30/00 252/301.36 |
| 2006/0047035 A1 * | 3/2006 | Chang | ................... | C09D 133/08 524/261 |
| 2007/0122633 A1 * | 5/2007 | Pesek | ................ | B32B 17/10825 428/442 |
| 2008/0063876 A1 * | 3/2008 | Sakoske | .................... | C03C 8/04 428/432 |
| 2015/0103513 A1 * | 4/2015 | Ge | .......................... | C08J 7/047 362/97.3 |

FOREIGN PATENT DOCUMENTS

| | | | | |
|---|---|---|---|---|
| JP | 2001179922 A | * | 7/2001 | |
| WO | WO-2010055570 A1 | * | 5/2010 | ............. B82Y 30/00 |

OTHER PUBLICATIONS

Bennison (High-Performance Laminated Glass for Structurally Efficient Glazing. Innovative Light-weight Structures and Sustainable Facades, Hong Kong, May 2008, 12 pages).*
Machine translated English language equivalent of JP 2001-179922 (Jul. 2001, pages).*
Brenntag (BSI #3400 Apyral 40CD(TX)—Precipitated ATH, Brenntag Specialties, Sep. 2011, one page).*

\* cited by examiner

*Primary Examiner* — Brieann R Johnston

(57) ABSTRACT

Provided herein is a translucent white polymer composition suitable for use as a safety glass interlayer. The translucent white polymer composition comprises a pigment and a polymeric resin that comprises an ionomer of an ethylene acid copolymer. Alumina ($Al_2O_3$) and alumina trihydrate ($Al(OH)_3$; "ATH") are preferred pigments. The translucent white polymer composition is useful in various molded articles. The translucent white polymer composition is particularly useful as an interlayer in glass laminates, including safety glass laminates and structural glass laminates. Further provided herein are methods of making the translucent white polymer composition, the articles and the glass laminates.

12 Claims, No Drawings

TRANSLUCENT WHITE POLYMER COMPOSITION AND ITS USE IN GLASS LAMINATES AND OTHER ARTICLES

CROSS-REFERENCE TO RELATED APPLICATION

This application claims priority under 35 U.S.C. § 120 as a continuation of U.S. patent application Ser. No. 13/773,968, filed on Feb. 22, 2013, which in turn claims priority under 35 U.S.C. § 119 to U.S. Provisional Appln. No. 61/602,920, filed on Feb. 24, 2012, each of which is incorporated herein by reference in its entirety.

FIELD OF THE INVENTION

The invention is directed to translucent white polymer compositions. In particular, the compositions include a pigment and a polymeric resin that is an ionomer of an ethylene acid copolymer. Alumina trihydrate (ATH) is one preferred pigment. Alumina is another preferred pigment. The translucent white polymer compositions are useful in various articles, such as molded articles. The translucent white polymer compositions are particularly useful as interlayers in glass laminates, including safety glass laminates and structural glass laminates.

BACKGROUND OF THE INVENTION

Several patents and publications are cited in this description in order to more fully describe the state of the art to which this invention pertains. The entire disclosure of each of these patents and publications is incorporated by reference herein.

Architects and designers often use frosted glass to allow light into a space while affording privacy to those within the space. Sand blasting and acid etching are two ways to produce frosted glass from smooth, transparent glass lites. Frosted glass is difficult to clean and maintain, however. In addition, sand blasting and acid etching are not medically or environmentally friendly processes, because of their many waste products, and because of the risk of burns from handling acids and silicosis from inhaling the dust that results from sand blasting. As a result, laminated glass with a diffuse translucent interlayer was developed. The interlayer provides the desired optical properties, and it may be laminated between smooth glass lites that are easy to clean and maintain. Often, the diffuse translucent interlayers are based on polyvinyl butyral compositions.

Translucent white polyvinyl butyral compositions are commercially available from every major manufacturer of polyvinyl butyral. Typically, the optical properties of these compositions feature light transmission (LT) of approximately 65%; clarity of approximately 15 to 30%; and haze of 95% or higher. The commercially available polyvinyl butyral compositions include calcium carbonate as a diffusing agent. In order to achieve the desired translucent appearance, interlayer sheets having a thickness or caliper of 0.76 mm contain approximately 2.5 wt % of calcium carbonate having a particle size of around 3.5 microns.

For certain structural or high strength applications, the superior mechanical properties of ionomeric interlayers such as DuPont™ SentryGlas® are required. These structural applications include architectural features, such as stairs, balconies and balustrades, and windows and skylights that are vulnerable to damage caused by severe weather or physical attack, for example.

Further in this connection, a variety of articles made from ionomers are used in our daily life. These articles may be made by injection molding processes, for example, and include items such as containers, caps or stoppers, trays, medical devices or instruments, handles, knobs, push buttons, panels, console boxes, footwear components, figurines or other decorative articles, and intermediate articles such as pre-forms or parisons. DuPont™ Surlyn® is one type of ionomeric material that has been used in fabricating these and other articles, because Surlyn®'s physical and optical properties are superior to those of many thermoplastic materials.

Moreover, the optical properties associated with etched, ground or frosted glass may also be considered desirable in these everyday articles. A translucent white polymer composition having characteristics similar to those of Surlyn® will provide the articles with the desired appearance and physical properties. In addition, the use of a suitable translucent white polymer composition will obviate the need to tool special molds or to treat the articles' surfaces with solvents or abrasives in order to obtain the desired appearance of frosted glass.

As is discussed above, calcium carbonate is a diffusing agent commonly used in commercially available translucent polyvinyl butyral compositions. When calcium carbonate is compounded into suitable ionomeric resins, however, significant foaming is frequently observed, due to the gas produced by the chemical reaction between the ionomer and the calcium carbonate.

Another commonly used whitening agent is titanium dioxide. The average particle size of titanium dioxide is too small to achieve the desired optical effects, however, whether the glass laminate includes a polyvinyl butyral interlayer or an ionomeric interlayer. More specifically, adding titanium dioxide to the interlayer reduces its light transmission but not its clarity. Therefore, the key design function of providing privacy is not achieved.

Other pigments with relatively low indices of refraction comparable to that of calcium carbonate are available. For example, silica, alumina, talc, clay, vermiculite, glass fibers, barium sulfate, alumina trihydrate (ATH), alumina ($Al_2O_3$), magnesium oxide (periclase), beryllium aluminate, calcium sulfate, zinc phosphate tetrahydrate and mullite have been used as fillers in ionomeric compositions. In fact, alumina trihydrate (ATH) has been compounded into ionomers at high loadings of approximately 65 parts ATH to 100 parts resin to achieve fire retardancy. Handbook of Fillers for Plastics Harry S. Katz and John Milewski, eds. Springer, 1988 pg. 296 (ISBN 978-0-442-26024-8). The resulting composition is opaque, however, not translucent. Moreover, the addition of ATH to ionomer is known to create significant amounts of gel in the compounded composition.

It is apparent from the foregoing that a need exists for translucent white polymer compositions that can be used in molded articles. It is further apparent that a need exists for translucent white polymer compositions that are suitable for use as interlayers in glass laminates, including safety glass laminates, and particularly as ionomeric interlayers for the safety glass laminates that are used in structural applications or other end uses requiring superior strength or stiffness.

SUMMARY OF THE INVENTION

Accordingly, provided herein is a translucent white polymer composition suitable for use in various articles having a frosted appearance. The translucent white polymer composition is particularly suitable for use as an interlayer in a glass laminate, for example a safety glass laminate or a structural glass laminate. The translucent white polymer composition comprises a pigment and a polymeric resin that comprises an ionomer of an ethylene acid copolymer. Alumina trihydrate is one preferred pigment. Alumina is another preferred pigment. Further provided herein are articles such as glass laminates comprising the translucent white polymer composition and methods of making the translucent white polymer composition and the articles.

DETAILED DESCRIPTION

The following definitions are used herein to further define and describe the disclosure. These definitions apply to the terms as used throughout this specification, unless otherwise limited in specific instances.

Unless otherwise defined, all technical and scientific terms used herein have the same meaning as commonly understood by one of ordinary skill in the art to which this invention belongs. In case of conflict, the present specification, including the definitions set forth herein, will control.

Unless explicitly stated otherwise in defined circumstances, all percentages, parts, ratios, and like amounts used herein are defined by weight.

When materials, methods, or machinery are described herein with the term "known to those of skill in the art", "conventional" or a synonymous word or phrase, the term signifies that materials, methods, and machinery that are conventional at the time of filing the present application are encompassed by this description. Also encompassed are materials, methods, and machinery that are not presently conventional, but that will have become recognized in the art as suitable for a similar purpose.

As used herein, the terms "comprises," "comprising," "includes," "including," "containing," "characterized by," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A 'consisting essentially of' claim occupies a middle ground between closed claims that are written in a 'consisting of' format and fully open claims that are drafted in a 'comprising' format. Optional additives as defined herein, at levels that are appropriate for such additives, and minor impurities are not excluded from a composition by the term "consisting essentially of".

When a composition, a process, a structure, or a portion of a composition, a process, or a structure, is described herein using an open-ended term such as "comprising," unless otherwise stated the description also includes an embodiment that "consists essentially of" or "consists of" the elements of the composition, the process, the structure, or the portion of the composition, the process, or the structure.

Further in this connection, certain features of the invention which are, for clarity, described herein in the context of separate embodiments, may also be provided in combination in a single embodiment. Conversely, various features of the invention that are, for brevity, described in the context of a single embodiment, may also be provided separately or in any sub-combination.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

Further, unless expressly stated to the contrary, the conjunction "or" refers to an inclusive or and not to an exclusive or. For example, the condition "A or B" is satisfied by any one of the following: A is true (or present) and B is false (or not present), A is false (or not present) and B is true (or present), and both A and B are true (or present). Exclusive "or" is designated herein by terms such as "either A or B" and "one of A or B", for example.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

In addition, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. The scope of the invention is not limited to the specific values recited when defining a range.

The term "alkyl group", as used herein alone or in combined form, such as, for example, "alkoxy group", refers to saturated hydrocarbon groups that have from 1 to 8 carbon atoms having one substituent and that may be branched or unbranched. The term "alkylene" refers to a saturated hydrocarbon having two substituents, such as methylene, ethylene or propylene.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 18 weight % of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such. The term "copolymer" may refer to polymers that consist essentially of copolymerized units of two different monomers (a dipolymer), or that consist essentially of more than two different monomers (a terpolymer consisting essentially of three different comonomers, a tetrapolymer consisting essentially of four different comonomers, etc.).

The term "acid copolymer" refers to a polymer comprising copolymerized units of an $\alpha$-olefin, an $\alpha,\beta$-ethylenically unsaturated carboxylic acid, and optionally other suitable comonomer(s), such as an $\alpha,\beta$-ethylenically unsaturated carboxylic acid ester.

The term "ionomer" refers to a polymer that is produced by partially or fully neutralizing an acid copolymer as described above.

The term "laminate", as used herein alone or in combined form, such as "laminated" or "lamination" for example, refers to a structure having at least two layers that are adhered or bonded firmly to each other, optionally using heat, vacuum or positive pressure. The layers may be adhered to each other directly or indirectly. "Directly" means that there is no additional material, such as an interlayer or an adhesive layer, between the two layers, and "indirectly" means that there is additional material between the two layers.

The term "glass laminate", as used herein, refers to a layered structure including a polymeric interlayer. The structure also includes one or more glass sheets. The layers of the glass laminate are adhered or bonded to each other so that the glass laminate retains its integrity under self-supporting conditions.

The term "safety glass laminate", as used herein, refers to a glass laminate that has the properties that are traditionally associated with safety glass, for example, one or more of high clarity, good adhesion to glass so that shattered fragments are retained by the interlayer, and resistance to penetration or puncturing by a mass travelling at velocities resulting from acceleration due to gravity at a height of about 3 meters.

The term "structural glass laminate", as used herein, refers to a subset of safety glass laminates that have superior properties, for example, being able to resist penetration or puncturing by a mass travelling at ballistic speeds, or having an interlayer that is able to maintain its structural integrity without support from an intact sheet of glass.

Several terms relating to optical properties are used herein. The term "transmittance", as used herein, is abbreviated as "T" and is defined in the Handbook of Optics, Volume 2 Devices, Measurements and Properties $2^{nd}$ Edition Optical Society of America, Michael Bass (editor) McGraw Hill 1995, pg 25.3, ISBN0-07-047974-7.

The terms "transmission" and "light transmission" and the abbreviation "LT" are synonymous and used interchangeably herein. The transmission of a material is the percentage of the total amount of light in the incident beam with which the material is illuminated ("input light") that travels through the material and, upon exiting the material, travels in a direction that has a vector component in the direction of the incident beam. The amount of transmitted light is reduced, compared to the total amount of input light, by the amount of light, if any, that is reflected, absorbed, and scattered backwards by the measured material. Transmission is measured according to ASTM Method No. D1003 (2000) using a HazeGard Plus hazemeter, available from BYK-Gardner USA of Columbia, Md.

The term "haze", as used herein, refers to the percentage of transmitted light which in passing through a material deviates from the incident beam by greater than 2.5 degrees. Haze is measured according to ASTM Method No. D1003 (20000) using a Hazegard Plus hazemeter.

The term "clarity", as used herein, is related to the percentage of transmitted light which in passing through a material deviates from the incident beam; however, the angle of the deviation is less than 2.5 degrees. Clarity is also measured using a Hazegard Plus hazemeter.

Further in connection with clarity, light that is not scattered (its angle of deviation equals zero degrees, also referred to as "specular transmitted light") is not included in the amount of low-angle scattered light. Evidently, a high degree of clarity means that a small amount of light is scattered. Stated algebraically, clarity as a percentage is defined as 100(1–(amount of low-angle scattered light)/(total amount of transmitted light)). Moreover, the total amount of transmitted light is the sum of the specular transmitted light, the high-angle scattered light (haze) and the low-angle scattered light.

Finally, the terms "L*", "a*", and "b*" refer to the axes of a three-dimensional system for reporting color values. "L*a*b*" values are measured according to CIE Publication 15.2 (1986) using a HunterLab Ultrascan XE spectrophotometer, available from HunterLab of Reston, Va.

Provided herein is a translucent white polymer composition that comprises a pigment and a polymeric resin. The polymeric resin comprises an ionomer of an ethylene acid copolymer.

Suitable pigments include alumina trihydrate (ATH), alumina ($Al_2O_3$), magnesium oxide (periclase), beryllium aluminate, calcium sulfate, zinc phosphate tetrahydrate and mullite either alone or in combination with other white pigments such as $TiO_2$. Suitable pigments have an index of refraction of about 1.5 to about 2.8, preferably about 1.5 to about 1.8.

Suitable pigment particles are able to scatter visible light. Consequently, the minimum average size of the suitable pigment particles is of the same order of magnitude as the wavelength of visible light, that is, about 380 to 720 nm. Because the appearance of the translucent white polymer composition is desirably uniform and similar to that of frosted glass, the individual pigment particles should not be visible to the naked eye. Consequently, the maximum median size (d50) of suitable pigment particles is about 0.2 mm. Preferably, the median particle size (d50) of the pigment is from about 1 micron to about 4 microns; more preferably from about 1.5 to about 3.0 microns, and still more preferably about 1.5 microns. The term "median particle size", as used herein, refers to values that are reported by pigment suppliers. Preferably, the aspect ratio of the pigment particles is close to 1; stated alternatively, the pigment particles are preferably approximately regularly polyhedral to spherical in shape. More preferably, the aspect ratio of the particles is in the range of 1.00±0.75; 1.00±0.50; 1.00±0.25; 1.00±0.10; or 1.00±0.05.

Examples of pigments that meet these physical and optical criteria include alumina trihydrate, alumina, talc, titanium dioxide, barium sulfate, silica, some clays, and combinations of two or more of these pigments. Alumina and combinations of alumina with other pigments are preferred.

More preferred are alumina trihydrate (Al(OH)$_3$; CAS No. 8064-00-4) and combinations of alumina trihydrate with other pigments, such as for example titanium dioxide. Still more preferably, the pigment consists essentially of alumina or of alumina trihydrate. The term alumina trihydrate (ATH) as used herein is synonymous and interchangeable with the terms aluminum (III) hydroxide, hydrated alumina, aluminum trihydrate, trihydrated alumina, and trihydroxy aluminum.

The translucent white polymer composition also includes a polymeric resin that comprises an ethylene acid copolymer, an ionomer of an ethylene acid copolymer, and combinations thereof. Suitable ethylene acid copolymers and ionomers are described in U.S. Pat. No. 7,641,965, issued to Bennison et al., for example. Briefly, however, the ethylene acid copolymer comprises copolymerized units of an α-olefin having from 2 to 10 carbon atoms and about 8 to about 30 wt %, preferably about 15 to about 30 wt %, more preferably about 20 to about 30 wt %, yet more preferably about 20 to about 25 wt %, or still more preferably about 21 to about 23 wt % of copolymerized units of an α,β-ethylenically unsaturated carboxylic acid having 3 to 8 carbon atoms. The weight percentage is based on the total weight of the ethylene acid copolymer. Preferably, the α-olefin comprises ethylene; more preferably, the α-olefin consists essentially of ethylene. Also preferably, the α,β-ethylenically unsaturated carboxylic acid comprises acrylic acid, methacrylic acid, or a combination of acrylic acid and methacrylic acid. More preferably, the α,β-ethylenically unsaturated carboxylic acid consists essentially of acrylic acid, methacrylic acid, or a combination of acrylic acid and methacrylic acid.

The ethylene acid copolymers may further comprise copolymerized units of other comonomer(s), such as unsaturated carboxylic acids having 2 to 10, or preferably 3 to 8 carbon atoms or derivatives thereof. Suitable acid derivatives include acid anhydrides, amides, and esters. Esters are preferred derivatives. Preferably the esters are α,β-ethylenically unsaturated carboxylic acid ester comonomers and include, but are not limited to, methyl acrylate, ethyl acrylate, isopropyl acrylate, butyl acrylate and combinations thereof.

The ethylene acid copolymers may be synthesized by any suitable polymerization process. For example, the ethylene acid copolymers may be polymerized as described in U.S. Pat. Nos. 3,404,134; 5,028,674; 6,500,888; and 6,518,365.

Preferably, the ethylene acid copolymer has a melt index (MI) of about 60 g/10 min or less, more preferably about 45 g/10 min or less, yet more preferably about 30 g/10 min or less, or yet more preferably about 25 g/10 min or less, or still more preferably about 10 g/10 min or less, as measured by ASTM method D1238 at 190° C. and 2.16 kg.

Some suitable ethylene acid copolymer resins are commercially available from E.I. du Pont de Nemours and Company of Wilmington, Del. ("DuPont"), under the trademark Nucrel®.

Preferably, the translucent white polymer composition includes a polymeric resin that comprises an ionomer of an ethylene acid copolymer or a mixture of these ionomers. To obtain the ionomers, at least a portion of the carboxylic acid moieties of the ethylene acid copolymers is neutralized to form carboxylate groups. Preferably about 5 to about 90%, more preferably about 10 to about 50%, yet more preferably about 20 to about 50%, or still more preferably about 20 to about 35% of the carboxylic acid groups are neutralized, based on the total carboxylic acid content of the ethylene acid copolymers. An example of a suitable procedure for neutralizing the ethylene acid copolymers is also described in U.S. Pat. No. 3,404,134.

The ionomers comprise cations as counterions to the carboxylate anions. Suitable cations include any positively charged species that is stable under the conditions in which the ionomer composition is synthesized, processed and used. Preferably, the cations are metal cations that may be monovalent, divalent, trivalent or multivalent. Combinations of two or more cations that may have different valencies, for example mixtures of Na$^+$ and Zn$^{2+}$ or mixtures of NH$_4^+$ and K$^+$, are also suitable. The cations are more preferably monovalent or divalent metal ions. Still more preferably, the metal ions are selected from the group consisting of ions of sodium, lithium, magnesium, zinc, and potassium and combinations of two or more thereof. Still more preferably, the metal ions are selected from the group consisting of ions of sodium, ions of zinc and combinations thereof. Still more preferably, the metal ions comprise or consist essentially of sodium ions.

The ionomer preferably has a MI of about 10 g/10 min or less, more preferably about 5 g/10 min or less, or still more preferably about 3 g/10 min or less, about 1.0 g/10 min or less, about 0.5 g/10 min or less, about 0.2 g/10 min or less, or about 0.1 g/10 min or less, as measured by ASTM method D1238 at 190° C. and 2.16 kg. The ionomer also preferably has a flexural modulus greater than about 40,000 psi (276 MPa), more preferably greater than about 50,000 psi (345 MPa), or still more preferably greater than about 60,000 psi (414 MPa), as measured by ASTM method D790 (Procedure A).

Some suitable ionomeric resins are commercially available from DuPont, under the trademarks Surlyn® resins and SentryGlas® interlayer sheets.

The amount of the pigment in the translucent white polymer composition is determined by the level necessary to achieve the desired optical properties, including transmittance, haze, clarity, and color. Of necessity, the amount of pigment required to attain the desired optical properties varies with the thickness of the portion of translucent white polymer composition whose properties are being measured. In addition, if one pigment is substituted for another, then different levels of the two pigments may be required to attain a desirable balance of optical properties. Variations between pigments, such as different particle sizes, aspect ratios or indices of refraction, have an effect on their optical properties in polymer blends. Broadly, however, for a sample having a thickness of about 0.64 mm and compounded with an unspecified pigment, the translucent white polymer composition may contain about 1.0 to about 10.0 wt % of the pigment and about 99 to about 90 wt % of the polymeric resin, based on the total weight of the translucent white polymer composition.

The translucent white polymer compositions may further comprise any other suitable additive(s) that are known in the art. Such additives may include, but are not limited to, plasticizers, processing aides, flow enhancing additives, lubricants, pigments, dyes, flame retardants, impact modifiers, nucleating agents, antiblocking agents (e.g., silica), UV stabilizers, dispersants, surfactants, chelating agents, coupling agents, adhesives, primers, reinforcement additives (e.g., glass fiber), other fillers that do not affect the optical properties of the translucent white polymer composition, and the like. Suitable additives, additive levels, and methods of incorporating the additives into the ionomer compositions may be found in the *Kirk-Othmer Encyclopedia of Chemical Technology*, 5th Edition, John Wiley & Sons (New Jersey, 2004).

In general, the total amount of these additives, if present, is less than 5 wt %, less than 3 wt %, less than 2 wt %, less than 1 wt %, or less than 0.5 wt %, based on the total weight of the translucent white polymer composition. In addition, the amount of each of these additives, if present, is preferably less than 10 wt %, less than 5 wt %, less than 3 wt %, less than 2 wt %, less than 1 wt %, less than 0.5 wt %, less than less than 0.2 wt %, or less than 0.1 wt %, based on the total weight of the translucent white polymer composition.

In this connection, the translucent white polymer compositions may contain, but preferably do not contain, additives for effecting and controlling cross-linking, such as organic peroxides, inhibitors and initiators. Four particularly useful additives, however, are thermal stabilizers, UV absorbers, hindered amine light stabilizers (HALS), and silane coupling agents. Suitable examples of cross-linking additives and of the four particularly useful additives and levels of these additives are set forth in detail in U.S. Pat. No. 7,641,965.

The translucent white polymer composition has highly desirable optical properties, similar to those of etched or frosted glass, in which a high percentage of the incident light is transmitted, and yet the transmitted image has a low definition. Thus, privacy and efficient use of ambient light are maintained.

There are two sets of optical properties that are of special note. The first set (Property Set A) results in a translucent white polymer composition that has a balance of properties in which the transmission is slightly lower (56 to 75%), the level of haze is high, and the level of clarity is low (10 to 30%). This property set sacrifices a significant percentage of the incoming light to scattering; however, a good level of privacy is provided by the low definition of the transmitted image. The second set (Property Set B) results in a translucent white polymer composition that has a balance of properties in which the transmission (80 to 90%), haze (75 to 85%) and clarity (70 to 86%) are all relatively high. In this property set, virtually all of the incoming light is transmitted; however, a lower percentage of light scattered at low angles (higher clarity of the transmitted image) means that less privacy is provided. Suitable, preferred and more preferred values of the optical characteristics for translucent white polymer compositions in each of these property sets are set forth in Tables A and B, below.

TABLE A

| Property Set A | Suitable | Preferred | More Preferred |
| --- | --- | --- | --- |
| % T | 56 to 75 | 60 to 73 | 63 to 70 |
| % H | 90 to 100 | 95 to 100 | 98 to 100 |
| % C | 10 to 30 | 12 to 28 | 15 to 25 |
| L* | 80 to 90 | 82 to 88 | 83 to 86 |
| a* | −0.2 to −1.8 | −0.4 to −1.3 | −0.5 to −1.0 |
| b* | 1.0 to 4.0 | 1.5 to 3.6 | 2.0 to 3.2 |

TABLE B

| Property Set B | Suitable | Preferred | More Preferred |
| --- | --- | --- | --- |
| % T | 80 to 90 | 82 to 88 | 83 to 87 |
| % H | 75 to 85 | 77 to 83 | 79 to 81 |
| % C | 70 to 86 | 73 to 83 | 75 to 80 |

TABLE B-continued

| Property Set B | Suitable | Preferred | More Preferred |
| --- | --- | --- | --- |
| L* | 85 to 96 | 88 to 95 | 90 to 93 |
| a* | −0.8 to −1.6 | −0.9 to −1.5 | −1 to −1.4 |
| b* | 0.8 to 2 | 0.9 to 1.8 | 1.0 to 1.6 |

The values for Property Set A and Property Set B are independent of the thickness of the sample of translucent white polymer composition through which the image is transmitted. For example, in order to attain Property Set A in an interlayer having a thickness of 1.6 mm, the amount of ATH having a median particle size of 1.5 to 4.5 microns is about 3.0 wt %. In order to attain Property Set A in an interlayer having a thickness 0.63 mm, the amount of ATH having a median particle size of 1.5 to 4.5 microns is about 6.25 wt %. Similarly, in order to attain Property Set B in an interlayer having a thickness of 1.6 mm, the amount of ATH having a median particle size of 1.5 to 4.5 microns is about 1.0 wt %. In order to attain Property Set B in an interlayer having a thickness of 0.63 mm, the amount of ATH having a median particle size of 1.5 to 4.5 microns is about 2.0 wt %.

More generally, however, other pigments and other thicknesses may be used to produce translucent white polymer compositions having differently tailored properties. For example, transmission is approximately proportional to the amount of pigment to the layer thickness. Clarity generally decreases as a well-behaved linear or quadratic function of pigment level, in a defined region spanning about 10 percentage points of clarity. Haze is high and relatively constant, once the desired transmission and clarity levels have been achieved.

The translucent white polymer composition may be made by any suitable process, such as melt mixing. High-shear melt-mixing is preferred. Suitable high shear mixing equipment includes static mixers, rubber mills, Brabender mixers, Buss kneaders, single screw extruders, twin screw extruders, heated or unheated two-roll mills, and the like. Additional examples of suitable compounding processes and conditions may also be found in the *Kirk-Othmer Encyclopedia* and the *Modern Plastics Encyclopedia*, McGraw-Hill (New York, 1995).

The translucent white polymer composition may be formed into a number of articles, including without limitation films, sheets, and molded articles. The molded articles may be prepared by any conventional molding process, such as compression molding, injection molding, extrusion molding, blow molding, injection blow molding, injection stretch blow molding, extrusion blow molding and the like. Articles may also be formed by combinations of two or more of these processes, such as for example when a core formed by compression molding is overmolded by injection molding. Information about these fabrication methods may be found in reference texts such as, for example, the *Kirk Othmer Encyclopedia*, the *Modern Plastics Encyclopedia*, McGraw-Hill (New York, 1995) or the *Wiley Encyclopedia of Packaging Technology*, 2d edition, A. L. Brody and K. S. Marsh, Eds., Wiley-Interscience (Hoboken, 1997).

In one alternative, the article comprising the translucent white polymer composition described herein is an injection molded article having a minimum thickness (i.e, the thickness at the smallest dimension of the article) of at least about 1 mm. Preferably, the injection molded article may have a thickness of about 1 mm to 100 mm, or 2 mm to 100 mm, or 3 to about 100 mm, or about 3 to about 50 mm, or about 5 to about 35 mm.

In another alternative, the article is an injection molded article in the form of a multi-layer structure, such as an over-molded article. At least one layer of the multi-layer structure comprises or consists essentially of the translucent white polymer composition described above and that layer has a minimum thickness of at least about 1 mm. Preferably, the at least one layer of the multi-layer article has a thickness of about 1 mm to 100 mm, or 2 mm to 100 mm, or about 3 to about 100 mm, or about 3 to about 50 mm, or about 5 to about 35 mm.

In yet another alternative, the article is an injection molded article in the form of a sheet, a container (e.g., a bottle or a bowl), a cap or stopper (e.g. for a container), a tray, a medical device or instrument (e.g., an automated or portable defibrillator unit), a handle, a knob, a push button, a decorative article, a panel, a console box, or a footwear component (e.g., a heel counter, a toe puff, or a sole). The article comprises or consists essentially of the translucent white polymer composition.

In yet another alternative, the article is an injection molded intermediate article for use in further shaping processes. For example, the article may be a pre-form or a parison suitable for use in a blow molding process to form a container (e.g., a cosmetic container). The injection molded intermediate article may be in the form of a multi-layer structure such as the one described above, and it may therefore produce a container having a multi-layer wall structure. Again, the article comprises or consists essentially of the translucent white polymer composition.

Injection molding is a well-known molding process. When the article described herein is in the form of an injection molded article, it may be produced by any suitable injection molding process. Suitable injection molding processes include, for example, co-injection molding and overmolding. These processes are sometimes also referred to as two-shot or multi-shot molding processes.

When the injection molded article is produced by an over-molding process, the translucent white polymer composition may be used as the substrate material, the over-mold material or both. In certain articles, when an overmolding process is used, the translucent white polymer composition described herein may be over-molded on a glass, plastic or metal container. Alternatively, the translucent white polymer composition may be over-molded on other articles (such as household items, medical devices or instruments, electronic devices, automobile parts, architectural structures, sporting goods, etc.) to form a soft touch and/or protective overcoating. When the over-mold material comprises the translucent white polymer composition described herein, the melt index of the composition is preferably from 0.1 g/10 min 010.75 g/10 min or 5 g/10 min up to about 35 g/10 min, as determined in accordance with ASTM D1238 at 190° C. and 2.16 kg.

In fabrication processes that incorporate a form of blow molding, such as, for example, injection blow molding, injection stretch blow molding and extrusion blow molding, and in substrates or monolayer articles that comprise the translucent white polymer composition, the composition preferably comprises an ionomer having zinc cations. When the overmolding material comprises the translucent white polymer composition, the composition preferably comprises an ionomer and the ionomer may comprise any suitable cation. Also preferably, the ionomer's precursor acid copolymer preferably has a melt index of 200 to 500 g/10 min, as determined in accordance with ASTM D1238 at 190° C. and 2.16 kg. In addition, the ionomer preferably has a melt index of from about 0.1 to about 2.0 g/10 min or from about 0.1 to about 35 g/10 min, as determined in accordance with ASTM D1238 at 190° C. and 2.16 kg. More specifically, when the substrate comprises the ionomer, the ionomer preferably has a melt index of about 0.5 to about 4 g/10 min. When the overmolding material comprises the ionomer, however, the ionomer preferably has a melt index of from 0.1 g/10 min or 0.75 g/10 min or 4 g/10 min or 5 g/10 min up to about 35 g/10 min.

Based on the ionomer composition and the process type that is to be used, one skilled in the art is able to determine the proper molding conditions required to produce a particular type of article. Briefly, however, the translucent white polymer composition may be molded at a melt temperature of about 120° C. to about 250° C., or about 130° C. to about 210° C. In general, slow to moderate fill rates with pressures of about 69 to about 110 MPa may be used. The mold temperatures may be in the range of about 5° C. to about 50° C., preferably 5° C. to 20° C., and more preferably 5° C. to 15° C.

Films and sheets comprising the translucent white polymer composition may be made by any suitable process. The terms "film" and "sheet", as used herein, refer to substantially planar, continuous articles. The term "continuous", as used in this context, means that the film or sheet has a length of at least about 3 m, at least about 10 m, at least about 50 m, at least about 100 m, or at least about 250 m. Moreover, the sheeting has an aspect ratio, that is, a ratio of length to width, of at least 5, at least 10, at least 25, at least 50, at least 75 or at least 100.

The difference between a film and a sheet is the thickness; however, there is no set industry standard for the precise thickness that distinguishes between a film and a sheet. As used herein, however, a film has a thickness of about 10 mils (0.25 mm), or less; preferably about 0.5 mils (0.012 mm) to about 10 mils (0.25 mm); more preferably about 1 mil (0.025 mm) to about 5 mils (0.13 mm). A sheet has a thickness of greater than about 10 mils (0.25 mm); preferably greater than about 15 mils (0.38 mm); more preferably greater than about 30 mils (0.75 mm); and still more preferably, greater than about 60 mils (1.50 mm), 90 mils (2.25 mm), or 120 mils (3.00 mm). The descriptions herein pertain equally to films and to sheets, unless otherwise limited in specific instances. For convenience, however, only one of these terms may be used in a given context.

Accordingly, suitable processes for forming sheets are described in the *Kirk-Othmer Encyclopedia* and the *Modern Plastics Encyclopedia*. For example, the sheets may be formed through dipcoating, solution casting, compression molding, injection molding, lamination, melt extrusion, blown film, extrusion coating, tandem extrusion coating, or any other suitable procedure. Preferably, the sheets are formed by a melt extrusion, melt coextrusion, melt extrusion coating, or tandem melt extrusion coating process.

In addition, the sheets comprising the translucent white polymer composition may have a smooth or rough surface on one or both sides. Preferably, the sheets have rough surfaces on both sides to facilitate the deaeration during the lamination process. Rough surfaces may be produced by conventional processes such as mechanical embossing. For example, the as-extruded sheet may be passed over a specially prepared surface of a die roll positioned in close proximity to the exit of the die. This die roll imparts the desired surface characteristics to one side of the molten polymer. Thus, when the surface of such a textured roll has minute peaks and valleys, the still-impressionable polymer sheet cast on the textured roll will have a rough surface on the side that is in contact with the roll. The rough surface generally conforms respectively to the valleys and peaks of the roll surface. Textured rolls are described in, e.g., U.S. Pat. No. 4,035,549 and U.S. Patent Application Publication No. 2003-0124296.

Further provided herein are glass laminates comprising an interlayer of the translucent white polymer composition. Suitable translucent white polymer compositions for use as interlayers in glass laminates are characterized by the desirable optical properties described above. Preferably, the glass laminates are safety glass laminates. Suitable translucent white polymer compositions for use as interlayers in safety glass laminates have physical properties including good adhesion to glass, high strength, and post-breakage structural performance, such as good puncture resistance.

The adhesion of an interlayer to glass may be measured by the pummel test or by 90° peel adhesion. The experimental methods are described in detail in the Examples, below. The pummel adhesion rating of an interlayer that is suitable for use in a safety glass laminate is greater than 6 pummel units. The 90° peel adhesion of an interlayer that is suitable for use in a safety glass laminate is greater than 2.0 N/mm.

Superior strength and good post breakage structural performance are correlated with the modulus of the interlayer. See, for example, S. Bennison, M. Qin, P. Davies, Innovative Light-Weight Structures and Sustainable Facades, Hong Kong May 2008; D. Delince, D. Callewaert, J. Belis, R. Van Impe in Conference on Architectural and Structural Applications of Glass, Delft University, May 2008. The modulus may be measured by dynamic mechanical analysis using a TA Instruments Q800 DMA available from TA Instruments, New Castle, Del. via ASTM 4065 at 1 Hz frequency and over the temperature range of −150 to 100° C. The modulus of a material that is suitable for use as an interlayer in a structural glass laminate is about 20 to about 60 kpsi. The modulus of a material that is suitable for use as an interlayer in a safety glass laminate may be somewhat lower.

Tensile properties are also correlated with good post breakage structural performance. Tensile properties such as strength and elongation at break may be measured according to ASTM D882. The experimental method is also described in the Examples, below. In general, materials that are suitable for use as an interlayer in a structural glass laminate have a strength of about 20 to about 40 MPa and an elongation of break of about 200 to about 400%. The strength and elongation at break of a material that is suitable for use as an interlayer in a safety glass laminate may be somewhat lower.

Structures of glass laminates that may suitably include a translucent white interlayer include, without limitation, the structures that are described in detail in U.S. Patent Appln. Publn. No. 2007/0228341. The translucent white interlayer may be substituted for any polymeric interlayer described therein. The most common laminates are glass/interlayer/glass laminates. When the translucent white interlayer is used, these laminates provide the optical properties of frosted glass together with the ease of cleaning associated with smooth glass surfaces and preferably the superior mechanical properties associated with safety glass having an ionomeric interlayer. Other useful structures include glass/interlayer/polyester film and glass/interlayer/polyester film/interlayer/glass, wherein the two interlayers may be the same or different, for example one pigmented and one unpigmented, or one ionomeric and one based on polyvinyl butyral or ethylene vinyl acetate. In order to attain the superior properties associated with structural glass laminates, the interlayer(s) are preferably ionomeric and preferably have a total thickness of at least 62 mil.

In general, the desired optical properties of the glass laminate are defined by the translucent white polymer composition, as the other layers of the glass laminate may be water white, such as for example smooth, clear, colorless glass or an unpigmented polymeric interlayer. Those of skill in the art, however, are capable of combining the optical properties of the translucent white polymer composition and those of other components of the glass laminates to provide the desired effects. For example, glass laminates that are both frosted and tinted may be obtained by tinting the translucent white polymer composition, by using tinted glass, or by including a tinted PET film in the laminate structure. In another example of combining optical properties, a decorative glass laminate in which a frosted effect is combined with a printed image may be produced, for example, by combining a printed PET film in a laminate with an interlayer of the translucent white polymer composition; by combining an interlayer of the translucent white polymer composition in a laminate with a printed interlayer to form a laminate such as those available from DuPont under the trademark SentryGlas® Expressions™ decorative glass; or by forming a laminate from an interlayer of the translucent white polymer composition onto which an image has been printed directly.

Structures of image-bearing laminates and methods for producing them are described in detail in U.S. Patent Appln. Publn. No. 2007/0245605. This reference is directed to displays comprising two images and an intervening opaque layer; advantageously, however, these displays may be adapted by substituting an interlayer of the translucent white polymer composition for an opaque layer or for another polymeric sheet. In addition, one of skill in the art will be able to adapt the displays so that they include only one image, if desired. Moreover, one of skill in the art will also be able to design various optical effects based on the laminates described in the '605 application. For example, a laminate displaying a misty image is produced when the image is viewed through an interlayer of translucent white polymer composition. An image against a frosted background is produced when the image is viewed against a background of the translucent white polymer composition interlayer. A laminate displaying a sharp image together with a misty image is produced when one image viewed against the background of the translucent white polymer composition interlayer and one image viewed through the translucent white polymer composition interlayer. This last structure corresponds to the laminate structures described in the '605 application, with the exception that the opaque layer is replaced with a layer of the translucent white polymer composition.

Glass laminates comprising the translucent white polymer composition may be made by any suitable process. Generally, glass laminates are made by autoclave lamination processes, such as those described in U.S. Pat. No. 7,763,360 and in U.S. Patent Appln. Publn. No. 2007/0228341. Non-autoclave lamination processes may also be used, however. Some examples of suitable non-autoclave lamination processes are also described in U.S. Pat. No. 7,763,360 and in U.S. Patent Appln. Publn. No. 2007/0228341.

The amount of pigment in the translucent white polymer composition described herein is believed to be too small to require significant changes to the lamination process, relative to an unpigmented interlayer that is otherwise of the same composition. It is believed, however, that one of ordinary skill in the art will be able to make any adjustments to the lamination process that may be required. For example, if the thermal conductivity of the translucent white interlayer is increased relative to that of the unpigmented interlayer, reasonable adjustments to the process include decreasing the lamination temperature or the cycle time.

The following examples are provided to describe the invention in further detail. These examples, which set forth specific embodiments and a preferred mode presently contemplated for carrying out the invention, are intended to illustrate and not to limit the invention.

EXAMPLES

Materials

The float glass was clear annealed float glass having a thickness of 2.3 mm, available from PPG Industries, Inc., of Pittsburgh, Pa. ("PPG"). The ionomer was derived from a copolymer of ethylene with methacrylic acid (22 wt %, based on the copolymer weight). The copolymer of ethylene with methacrylic acid had a melt index prior to neutralization of 1.8 g/10 min (ASTM D1238; 190 C, 2.16 kg). The ionomer's neutralization level was 1.6% or 15%, and the cation was sodium. The alumina trihydrate ($Al(OH)_3$ or ATH) was grade BSI 3400, obtained from Brenntag Specialties, Inc., of Philadelphia, Pa. The alumina ($Al_2O_3$) had a particle size of 3 microns and was obtained from Pace Technologies of Tucson, Ariz.

Standard Procedures

The glass laminates described below were produced by stacking the individual layers of the laminate in order to form a pre-press assembly. The pre-press assembly is heated at 120° C. for 1 hour under vacuum and then processed in an air autoclave at 135° C./200 psig for 30 min hold time to provide the glass laminate.

The laminates for pummel adhesion testing were prepared by placing the ionomer sheeting between two lites of float glass. The "tin" side of the float glass lites was in contact with the ionomer. This pre-press assembly was laminated according to the standard procedure. The laminate was conditioned at 23 to 25° C. for a minimum of 2 hours prior to pummel adhesion testing. The conditioned laminate was held at a 45° angle on a support table and struck by hand with a 454 g (1 lb) hammer to pulverize the top layer of float glass over an area of about 3 by 4 inches. The pulverized glass that was not adhered to the interlayer was removed. The area of the interlayer that was bare of remaining adhered glass was evaluated visually and rated according to the standards set forth in the Table, below.

Table of Pummel Rating Standards

| % Bare Interlayer | Pummel Value |
|---|---|
| 100 | 0 |
| 95 | 1 |
| 90 | 2 |
| 85 | 3 |
| 60 | 4 |
| 40 | 5 |
| 20 | 6 |
| 10 | 7 |
| 5 | 8 |
| 2 | 9 |
| 0 | 10 |

The laminates for 90° peel adhesion testing were prepared by laminating the ionomer sheeting to a single lite of float glass. The "tin" side of the float glass lite was in contact with the ionomer. This pre-press assembly was laminated according to the standard procedures, then conditioned at room temperature (23 to 25° C.) for at least 24 h. The conditioned laminate was subjected to a 90° peel test using an Instron Model 5500R tensile tester, available from Instron, a business segment of Illinois Tool Works of Glenview, Ill. Instron Worldwide headquarters is at Norwood, Mass. The tensile tester was equipped with a 50 lb load cell and the crosshead speed was 25.4 mm/min.

Tensile properties were measured according to ASTM D882 using an Instron Model 1122 mechanical testing apparatus. The films were conditioned at room temperature (23° C.±2° C.) and 50% relative humidity prior to testing.

Comparative Example 1

Butacite® Translucent White polyvinyl butyral sheeting having a caliper of 0.76 mm (available from DuPont) was laminated between two lites of float glass.

Comparative Example 2

The ionomer and Ti-Pure® R105 titanium dioxide (0.027 wt % loading; available from DuPont) were fed into a 1.5 inch single screw extruder (Model DS-15H, available from Davis-Standard, LLC, of Pawcatuck, Conn.) to produce a sheet having a caliper of 0.63 mm. The extruder temperature conditions were as follows:

| | |
|---|---|
| Zone 1 | 128° C. |
| Zone 2 | 149° C. |
| Zone 3 | 180° C. |
| Zone 4 | 180° C. |
| Die | 180° C. |

This sheeting was laminated between two lites of float glass.

Comparative Examples 3 and 4 and Examples 5 to 12

The ionomer was compounded with $Al(OH)_3$ and extruded into sheeting under the extruder conditions that are set forth above in Comparative Example 2. The sheeting had a caliper of 0.63 mm. The loading of $Al(OH)_3$ in each sheet is a weight percentage, based on the total weight of the translucent white polymer composition, and is set forth in Table 1. A portion of each sheet was laminated between two lites of float glass.

Example 13

The ionomer was extruded as a trilayer sheeting wherein the outermost layers were clear and the inner layer contained $Al(OH)_3$ (6.25%). The total sheeting caliper was 1.59 mm; the thickness of the translucent white layer was 0.63 mm and the thickness of each of the two clear outer layers was 0.48 mm. The three layers were produced by three extruders that were associated with a Killion horizontal three-layer stack having 14-inch rolls. The white layer was produced by the Model DS-15H extruder; one clear layer was produced by an HPE-150 side extruder, and the second clear layer was produced by a DS-15 side extruder. The Killion equipment and the two side extruders are available from Davis-Standard, LLC. The trilayer sheeting was laminated between two lites of float glass.

Example 14

The ionomer was compounded with alumina ($Al_2O_3$) and extruded as sheeting under the extruder conditions that are set forth above in Comparative Example 2. The loadings are given in Table 1. The sheeting caliper was 0.63 mm. The sheeting was laminated between two lites of float glass.

Examples 15 and 16

The ionomer was compounded with $Al(OH)_3$ and extruded into sheeting having a caliper of 0.63 mm under the conditions described in Comparative Example 2. Two layers of the sheeting were plied together to form an interlayer with a total thickness of 1.26 mm. The plied sheeting was laminated between two lites of float glass according to the standard procedure. The results for Examples 15 and 16, set forth in Table 1, are similar to those obtained in Examples 7 and 6, respectively.

Example 17

The ionomer was compounded with $Al(OH)_3$ (6.25%) and extruded into sheeting having a caliper of 0.63 mm under the conditions described in Comparative Example 2. A layer of this sheeting was plied with a layer of clear sheeting. The ionomer was the same in both layers, and the caliper of the clear sheeting was 0.96 mm. The plied sheeting was laminated between two lites of float glass according to the standard procedure. The results, set forth in Table 1, are similar to those obtained in Example 7.

Example 18

The ionomer was compounded with the alumina ($Al_2O_3$, 1.15%) and extruded into sheeting having a caliper of 0.89 mm under the conditions described in Comparative Example 2. The sheeting also contained Tinuvin® 328 (0.17%), available from the BASF Corporation of Florham Park, N.J., as a UV absorber. The sheeting was laminated between two lites of float glass according to the standard procedure. The results are shown in Table 1.

TABLE 1

Optical Properties of Laminates

| Sample | Pigment | Loading, wt % | % T | % H | % C | L* | a* | b* |
|---|---|---|---|---|---|---|---|---|
| C1 PVB | $CaCO_3$ | 5.0 | 64.1 | 98.5 | 20.9 | 82.6 | −1.33 | 3.33 |
| C2 | $TiO_2$ | 0.027 | 71.2 | 30.6 | 98.9 | 86.2 | −0.25 | 4.3 |
| C3 | $Al(OH)_3$ | 1.0 | 88.8 | 58 | 95.8 | 94.12 | −1.32 | 0.97 |
| C4 | $Al(OH)_3$ | 2.0 | 86.5 | 80.2 | 91.7 | 92.78 | −1.20 | 1.02 |
| 5 | $Al(OH)_3$ | 3.0 | 80.8 | 95 | 78.6 | 89.70 | −1.04 | 1.66 |
| 6 | $Al(OH)_3$ | 4.0 | 75.2 | 97.7 | 59.7 | 86.99 | −0.86 | 2.30 |
| 7 | $Al(OH)_3$ | 6.25 | 65.40 | 98.90 | 25.17 | 81.89 | −0.66 | 3.08 |
| 8 | $Al(OH)_3$ | 6.50 | 64.33 | 98.93 | 21.87 | 81.26 | −0.65 | 3.10 |
| 9 | $Al(OH)_3$ | 6.75 | 63.23 | 99.03 | 19.03 | 80.69 | −0.61 | 3.11 |
| 10 | $Al(OH)_3$ | 7.00 | 62.57 | 99.00 | 18.43 | 80.73 | −0.64 | 3.13 |
| 11 | $Al(OH)_3$ | 7.25 | 61.93 | 98.43 | 17.43 | 80.22 | −0.61 | 3.16 |
| 12 | $Al(OH)_3$ | 8.00 | 59.77 | 98.93 | 14.37 | 78.93 | −0.67 | 3.09 |
| 13 | $Al(OH)_3$ | 6.25 | 60.7 | 99.10 | 12.50 | 79.05 | −0.57 | 3.36 |
| 14 | $Al_2O_3$ | 2.5 | 69.2 | 96.1 | 33.7 | 83.9 | −1.12 | 1.6 |
| 15 | $Al(OH)_3$ | 3.0/3.0 | 68.90 | 98.7 | 27.9 | 82.31 | −0.62 | 3.33 |
| 16 | $Al(OH)_3$ | 2.0/2.0 | 79.0 | 95.2 | 76.9 | 89.26 | −1.01 | 2.10 |
| 17 | $Al(OH)_3$ | 6.25/0 | 67.93 | 98.8 | 24.9 | 82.4 | −1.03 | 2.53 |
| 18 | $Al_2O_3$ | 1.15 | 72.2 | 95.3 | 58.3 | 84.28 | −1.17 | 2.09 |

Comparative Example C19 and Examples 20 to 24

The adhesion properties of the translucent white ionomers were measured by pummel adhesion and by 90° peel adhesion tests, as described in the Standard Procedures, above. The ionomer was compounded with ATH (for Examples 19 and 20) and extruded into sheeting having a caliper of 0.63 mm under the conditions described in Comparative Example 2.

The adhesion measurements, which are set forth in Table 2, demonstrate that the pigment may have a favorable effect on the adhesion of an ionomeric interlayer to glass.

TABLE 2

Adhesion Properties

| Example | Pigment | Loading, % | Pummel Adhesion | 90° Peel Adhesion, N/mm$^2$ |
|---|---|---|---|---|
| C19 | None | 0 | 7 | 0.9 |
| 20 | $Al(OH)_3$ | 6.25 | 9 | 2.9 |
| 21 | $Al(OH)_3$ | 6.50 | 9 | 3.1 |
| 22 | $Al_2O_3$ | 1.15 | 9 | Not available |
| 23 | $Al_2O_3$ | 2.3 | 9 | Not available |
| 24 | $Al_2O_3$ | 3.45 | 9 | Not available |

Comparative Example C25 and C31 and Examples 26 to 35

The tensile properties of the translucent white ionomers were measured according to the standard procedure set forth above. The ionomer was compounded with ATH (for Examples 26 to 30) or $Al_2O_3$ (for Examples 32 to 35) and extruded into sheeting under the conditions described in Comparative Example 2. The results, which are set forth in Table 3, demonstrate that the translucent white polymer composition maintains tensile strength and elongation at break at values sufficient to enable the translucent white polymer composition to act as an interlayer in a functioning safety glass laminate.

TABLE 3

Mechanical Properties

| Example | Pigment | Loading, % | Tensile Strength, psi | % Elongation at Break |
|---|---|---|---|---|
| C25 | ATH | 0 | 5248 | 481 |
| 26 | ATH | 2.0 | 4253 | 344 |
| 27 | ATH | 4.0 | 3865 | 291 |
| 28 | ATH | 6.25 | 5198 | 182 |
| 29 | ATH | 7.0 | 3942 | 318 |
| 30 | ATH | 8.0 | 3984 | 352 |
| C31 | $Al_2O_3$ | 0 | 6333 | 592 |
| 32 | $Al_2O_3$ | 2.5 | 6376 | 581 |

TABLE 3-continued

Mechanical Properties

| Example | Pigment | Loading, % | Tensile Strength, psi | % Elongation at Break |
|---|---|---|---|---|
| 33 | $Al_2O_3$ | 5 | 6139 | 570 |
| 34 | $Al_2O_3$ | 6.25 | 5978 | 557 |
| 35 | $Al_2O_3$ | 7.5 | 5549 | 547 |

While certain of the preferred embodiments of this invention have been described and specifically exemplified above, it is not intended that the invention be limited to such embodiments. Various modifications may be made without departing from the scope and spirit of the invention, as set forth in the following claims.

What is claimed is:

1. A glass laminate comprising an interlayer and at least one glass sheet, said interlayer comprising a film or sheet of a translucent white polymer composition comprising from 1.0 to about 10.0 wt %, based on the total weight of the translucent white polymer composition, of a pigment mixed into a resin, wherein:
the resin is an ethylene acid copolymer or an ionomer of an ethylene acid copolymer;
the pigment consists essentially of alumina trihydrate; said pigment having an index of refraction of about 1.5 to about 2.8; and said pigment consisting essentially of particles having a minimum average size of about 380 nm, a median particle size (d50) of about 1.5 to about 3.0 microns, and an aspect ratio close to 1; and
the film or sheet of the translucent white polymer composition has a transmission of less than 90%, a haze of 75 to 100%, an L* value higher than 80, an a* value that ranges from −0.2 to −1.8, and a b* value that ranges from 0.8 to 4.0.

2. The glass laminate of claim 1, wherein the film or sheet of the translucent white polymer composition has a transmission of from 56 to 75%, a haze of from 90 to 100%, a clarity of from 10 to 30%, an L* value that ranges from 80 to 90, an a* value that ranges from −0.2 to −1.8, and a b* value that ranges from 1.0 to 4.0.

3. The glass laminate of claim 1, wherein the film or sheet of the translucent white polymer composition has a transmission of from 80 to 90%, a haze of from 75 to 85%, a clarity of from 70 to 86%, an L* value that ranges from 85 to 96, an a* value that ranges from −0.8 to −1.6, and a b* value that ranges from 0.8 to 2.0.

4. The glass laminate of claim 1, wherein the alumina trihydrate has a median particle size of from 1.5 to 4.5 microns.

5. The glass laminate of claim 1, wherein the 90° peel adhesion strength of the film or sheet to the glass sheet is greater than 2.0 N/mm.

6. The glass laminate of claim 1, wherein the modulus of the translucent white polymer composition is from about 20 to about 60 kpsi.

7. The glass laminate of claim 1, wherein the strength of the interlayer is about 20 to about 40 MPa.

8. The glass laminate of claim 1, wherein the elongation at break of the laminate is about 200 to about 400%.

9. The glass laminate of claim 1, wherein the ethylene acid copolymer comprises copolymerized units of ethylene; about 8 to about 30 wt % copolymerized units of acrylic acid, methacrylic acid, or a combination of acrylic acid and methacrylic acid; and, optionally copolymerized units of one or more additional comonomers selected from the group consisting of derivatives of one or more unsaturated carboxylic acids, said unsaturated carboxylic acids having 2 to 10 carbon atoms, and said derivatives selected from the group consisting of acid anhydrides, amides and esters.

10. The glass laminate of claim 9, wherein the ethylene acid copolymer is an ionomer in which about 5% to about 90% of carboxylic acids groups are neutralized, based on the total carboxylic acid content of the ethylene acid copolymer.

11. The glass laminate of claim 1, which is a safety glass laminate.

12. The glass laminate of claim 1, which is a structural glass laminate.

* * * * *